(12) United States Patent
Zheng et al.

(10) Patent No.: US 11,025,964 B2
(45) Date of Patent: Jun. 1, 2021

(54) METHOD, APPARATUS, SERVER, AND STORAGE MEDIUM FOR GENERATING LIVE BROADCAST VIDEO OF HIGHLIGHT COLLECTION

(71) Applicant: WANGSU SCIENCE & TECHNOLOGY CO., LTD., Shanghai (CN)

(72) Inventors: Zhengui Zheng, Shanghai (CN); Lei Sun, Shanghai (CN); Xiangxiang Chen, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/569,866

(22) Filed: Sep. 13, 2019

(65) Prior Publication Data
US 2020/0322647 A1    Oct. 8, 2020

Related U.S. Application Data

(63) Continuation of application No. PCT/CN2019/086049, filed on May 8, 2019.

(30) Foreign Application Priority Data

Apr. 2, 2019   (CN) .......................... 201910262673.7

(51) Int. Cl.
*H04N 21/2187* (2011.01)
*H04N 21/2343* (2011.01)
*H04N 21/231* (2011.01)

(52) U.S. Cl.
CPC ..... *H04N 21/2187* (2013.01); *H04N 21/2343* (2013.01); *H04N 21/23106* (2013.01)

(58) Field of Classification Search
CPC ......... H04N 21/2187; H04N 21/23106; H04N 21/2343
(Continued)

(56) References Cited

U.S. PATENT DOCUMENTS 8,495,697 B1 * 7/2013 Goldfeder .......... H04N 21/8541
                                                     725/142
2003/0056213 A1   3/2003 McFaddin et al.
(Continued)

FOREIGN PATENT DOCUMENTS

CN     101751926 A    6/2010
CN     102547214 A    7/2012
(Continued)

OTHER PUBLICATIONS

International Search Report for International Patent Application No. PCT/CN2019/086049 dated Jan. 2, 2020.
(Continued)

*Primary Examiner* — Dominic D Saltarelli
(74) *Attorney, Agent, or Firm* — Heslin Rothenberg Farley & Mesiti P.C.

(57) ABSTRACT

Some embodiments of the present disclosure relate to the field of video processing, and disclose a method, an apparatus, a server, and a storage medium for generating a live broadcast video of highlight collection. The method for generating a live broadcast video highlight in the embodiments of the present disclosure includes: identifying a live broadcast picture from a live broadcast video and determining if a target image element exists in the live broadcast picture; if the target image element exists in the live broadcast picture, saving, as a highlight segment, a segment of live broadcast video having the live broadcast picture; when a merging condition is satisfied, merging the highlight segment into the live broadcast video based on the merging
(Continued)

condition to obtain a merged video of highlight collection; and switching an output live broadcast video to the merged video of highlight collection.

16 Claims, 6 Drawing Sheets

(58) Field of Classification Search
USPC .......................................................... 725/115
See application file for complete search history.

(56) References Cited

U.S. PATENT DOCUMENTS

| | | | |
|---|---|---|---|
| 2014/0250484 A1 | 9/2014 | Duennebier et al. | |
| 2015/0310894 A1 | 10/2015 | Stieglitz | |
| 2016/0286244 A1* | 9/2016 | Chang | H04N 21/4788 |
| 2017/0289617 A1 | 10/2017 | Song et al. | |
| 2019/0267041 A1* | 8/2019 | Ricciardi | G11B 27/031 |

FOREIGN PATENT DOCUMENTS

| | | |
|---|---|---|
| CN | 103605953 A | 2/2014 |
| CN | 105744292 A | 7/2016 |
| CN | 107682717 A | 2/2018 |
| CN | 108540854 A | 9/2018 |
| CN | 108769801 A | 11/2018 |
| CN | 109089128 A | 12/2018 |
| CN | 109194978 A | 1/2019 |

OTHER PUBLICATIONS

Search Report for Chinese Patent Application No. 201910262673.7 dated Jan. 3, 2020.
Extended European Search Report for European Patent Application No. 19765403.1 dated Jun. 15, 2020.
Communication pursuant to Article 94(3) EPC for European Patent Application No. 19765403.1 dated Mar. 15, 2021.

* cited by examiner

METHOD, APPARATUS, SERVER, AND STORAGE MEDIUM FOR GENERATING LIVE BROADCAST VIDEO OF HIGHLIGHT COLLECTION

CROSS-REFERENCE TO RELATED APPLICATIONS

The present disclosure is a continuation of international application No. PCT/CN2019/086049, filed on May 8, 2019, and titled "method, apparatus, server, and storage medium for generating live broadcast video of highlight collection", which is incorporated herein by reference in its entirety. The PCT application and present disclosure claims priority to Chinese Patent Application No. 201910262673.7, filed on Apr. 2, 2019, and entitled "method, apparatus, server, and storage medium for generating live broadcast video of highlight collection", which is incorporated herein by reference in its entirety.

TECHNICAL FIELD

Embodiments of the present disclosure relate to the field of video processing, and in particular, to a method, an apparatus, a server, and a storage medium for generating a live broadcast video of highlight collection.

BACKGROUND

Online video broadcast is an on-site live broadcast service performed by using network resources. A video photographed on site is synchronously uploaded to a network, so that a user may learn the first time on-site information over the network at the same time. Such an on-site live broadcast service on the network is widely applied to network live broadcast services that are carried out in real time, such as news conference, exhibition, product release, product promotion, sales spot demonstration, network concert, company cocktail buffet, business conference, ceremony, program performance, athletic contest, game contest, security analysis, and distance education, and so on.

During playing of a live broadcast video, viewers generally have a great interest in a highlight segment in the live broadcast video. To ensure that the viewers could repeatedly view the highlight segment in the live broadcast video, generally, an offline editing is performed manually after the live broadcast ends, and then the highlight segment is released in an on-demand manner for viewers to search and view.

The inventor finds that the prior art has at least the following problems: the offline editing is performed after the live broadcast is completed, so that the user could only request on-demand broadcast after the live broadcast ends, which would affect the users' viewing experience. Moreover, a large number of human resources have to be invested to generate an edited video, and thus the efficiency is low, which can not meet the requirements of the booming live broadcast industry.

SUMMARY

An objective of some embodiments of the present disclosure is to provide a method and an apparatus for generating a live broadcast video of highlight collection, a server, and a storage medium, so that in a live broadcast viewing process, a user can simultaneously view a live broadcast video of highlight collection, and the live broadcast video of highlight can be autonomously edited, thereby improving editing efficiency.

To solve the foregoing technical problem, an embodiment of the present disclosure provides a method for generating a live broadcast video of highlight collection, including: identifying a live broadcast picture from a live broadcast video and determining if a target image element exists in the live broadcast picture; if the target image element exists in the live broadcast picture, saving, as a highlight segment, a segment of live broadcast video having the live broadcast picture; when a merging condition is satisfied, merging the highlight segment into the live broadcast video based on the merging condition to obtain a merged video of highlight collection; and switching an output live broadcast video to the merged video of highlight collection.

An embodiment of the present disclosure further provides an apparatus for generating a live broadcast video of highlight collection, including: an apparatus for generating a live broadcast video of highlight collection, comprising: a first identification module, a storage module, a second identification module, a merging module, and an output module, wherein the first identification module is configured for identifying a live broadcast picture from a live broadcast video and determining if a target image element exists in the live broadcast picture; the storage module is configured for saving, as a highlight segment, a segment of live broadcast video having the live broadcast picture, if the target image element exists in the live broadcast picture; the second identification module is configured for identifying if a merging condition is satisfied; the merging module is configured for merging the highlight segment into the live broadcast video based on the merging condition to obtain a merged video of highlight collection, when the merging condition is satisfied; and the output module is configured for switching an output live broadcast video to the merged video of highlight collection.

An embodiment of the present disclosure further provides a server, including: at least one processor; and a memory communicatively connected to the at least one processor, wherein the memory stores instructions executable by the at least one processor, and the instructions are executed by the at least one processor to enable the at least one processor to implement the method for generating a live broadcast video of highlight collection described above.

An embodiment of the present disclosure further provides a storage medium storing a computer program, wherein when being executed by a processor, the computer program implements the method for generating a live broadcast video of highlight collection described above.

Compared with the prior art, in this embodiment of the present disclosure, during live broadcast, the server identifies if the target image element exists in the live broadcast picture. When the target image element is identified in the live broadcast picture, it indicates that the live broadcast picture has a feature for a picture of a highlight moment, and it may be determined that a live broadcast segment having the live broadcast picture is a highlight segment; when it is identified by the server that the merging condition is satisfied, the identified and saved highlight segment is merged into the live broadcast video to obtain a live broadcast video of highlight collection, and the merged live broadcast video of highlight collection is output, so that in a live broadcast viewing process, the user may also view the highlight collection played in the live broadcast video, thereby improving timeliness of playing of a video of highlight collection. Moreover, during editing, it is not necessary to identify highlight segment manually, thereby saving a lot of human resources and solving the problem of low efficient manual editing.

In addition, the merging the highlight segment into the live broadcast video to obtain a merged video of highlight collection specifically comprises: decoding the highlight segment, and decoding the live broadcast video; merging the decoded highlight segment into the decoded live broadcast video to obtain merged data; and recoding the merged data to obtain the merged video of highlight collection. During saving of the highlight segment, video data in an encoding state is saved, so that the video data in an encoding state is stored; when the highlight segment and the live broadcast video are needed to be merged, the highlight segment is decoded and recoded after the merging. That is, the method ensures merging of the highlight segment and the live broadcast video and the data could also be compressed. As the compressed data occupies relatively small space, thereby facilitating transmission of the merged video of highlight collection and improving transmission efficiency of the merged video of highlight collection.

In addition, the merged data comprises: merged video data and merged audio data; and the merging the decoded highlight segment into the decoded live broadcast video specifically comprises: merging each video frame of the decoded highlight segment with each video frame of the decoded live broadcast video in a preset mode, to obtain the merged video data; and merging an audio stream of the decoded highlight segment and an audio stream of the decoded live broadcast video in form of audio mixing, to obtain the merged audio data. In this way, the user may listen to audio of the highlight segment while viewing the live broadcast video, and view pictures of the highlight segment, so that the user may obtain all information of the played video.

In addition, the method further comprises performing the following steps before the determining if a target image element exists in the live broadcast picture: caching a data packet of the live broadcast video in real time; and the saving, as a highlight segment, a segment of live broadcast video having the live broadcast picture specifically comprises: saving the currently cached data packet of the live broadcast video as the highlight segment. In this way, storage space occupied for storing the highlight can be reduced.

In addition, the method further comprises performing the following step before the saving the currently cached data packet of the live broadcast video as the highlight segment: determining if a playing duration of the currently cached data packet of the live broadcast video exceeds a preset upper limit; and if the preset upper limit is exceeded, discarding a part of data in the cached data packet of the live broadcast video. In this way, a length of the highlight segment may be controlled to reduce memory required for saving the highlight segment, and discarding a part of data may further make a key point of the highlight more outstanding, so that it prevents the user from consuming energy on redundant information, and the user may view a highlight video segment more conveniently.

In addition, the discarding a part of data in the cached data packet of the live broadcast video specifically comprises: sequentially discarding, according to a playing order of the data packet of the live broadcast video, video frame sequences in the currently cached data packet of the live broadcast video from front to back, until the playing duration of the cached data packet of the live broadcast video obtained after the discarding does not exceed the preset upper limit. In this way, it can be ensured that the highlight segment is in a preset duration, and a data length of the highlight segment is thus kept within the preset upper limit, thereby reducing memory required for saving the highlight segment. The cached data packet of the live broadcast video is sequentially discarded from front to back, thus the timeliness of the highlight segment may be ensured; and because the highlight segment obtained after data is discarded has relatively short duration, a subsequent operation of merging the highlight segment into the live broadcast video may be simplified, thereby improving efficiency of obtaining the merged video of highlight collection.

In addition, the data packet of the live broadcast video saved as the highlight segment is specifically a cached data packet of the live broadcast video in which a first video frame thereof is a key frame. The key frame herein is a key frame during video coding. The first video frame of the obtained highlight segment is the key frame, so that operations of video decoding, merging, encoding, compression, and switching may be normally performed on the highlight segment, thereby avoiding the problem in playing of the merged video of highlight collection merged by the highlight segments.

In addition, before a merging moment is identified, the method further includes: if the number of the saved highlight segment is more than one, splicing a plurality of highlight segments into one highlight collection; and the merging the highlight segment into the live broadcast video is specifically: merging the highlight collection into the live broadcast video. In this way, the user may view highlight segments obtained at different time points, which provides to the user enjoyment of continuous viewing, and improves viewing experience of the user.

In addition, the splicing the plurality of highlight segments into one highlight collection specifically comprises: editing each of the highlight segment; performing a timestamp recovery on the edited highlight segment; and splicing each of the highlight segment obtained after the timestamp recovery, into one highlight collection according to a timestamp order. This can ensure continuity of the highlight segment, and avoid phenomena of video freezing and rolling-back during video playing.

In addition, the switching the output live broadcast video to the merged video of highlight collection specifically comprises: determining if a switching time point is satisfied, according to a timestamp of the live broadcast video; and if the switching time point is satisfied, switching the output live broadcast video to the merged video of highlight collection. In this way, it can be ensured that the user will not miss a highlighted live broadcast, and at the same time, the live broadcast video is switched to the merged video of highlight collection at time points when live broadcasting contents not interested by the user.

In addition, the method further comprises performing the following after the switching the output live broadcast video to the merged video of highlight collection: determining remaining duration of the merged video of highlight collection; and when the remaining duration is zero, switching the output merged video of highlight collection to the live broadcast video. In this way, after the merged video of highlight collection is played to the end, the merged video of highlight collection is switched to the live broadcast video, and the merged video of highlight collection and the live broadcast video are seamlessly connected in a playing process, so that continuity of video viewing by the user is ensured, thereby improving the viewing experience of the user.

In addition, the method further comprises performing the following after the switching the output live broadcast video to the merged video of highlight collection: determining remaining duration of the merged video of highlight collection; and when the remaining duration of the merged video of highlight collection is zero, determining if a first video frame of the live broadcast video is a key frame; and if the first video frame of the live broadcast video is the key frame, switching an output merged video of highlight collection to the live broadcast video. When the remaining duration of the merged video of highlight collection is zero and the first video frame of the live broadcast video is the key frame, normally playing of the video after switching may be ensured, and playing problems such as data loss, freezing and rolling-back will not occur; and it may further ensure that the merged video of highlight collection and the live broadcast video are seamlessly connected in a playing process, so that the user may continuously view the video, thereby improving the viewing experience of the user.

In addition, the identifying a live broadcast picture and determining if a target image element exists in the live broadcast picture specifically comprises: identifying the live broadcast picture and determining if the target image element exists in the live broadcast picture, according to an image identification model established in advance, wherein the image identification model is trained according to collected image features. The highlight segment is autonomously identified by using a pre-trained image identification model, so that the highlight segment can be obtained more accurately and rapidly, thereby improving efficiency of editing the highlight segment and reducing consumption on human resources.

In addition, identifying the live broadcast picture and determining if the target image element exists in the live broadcast picture, according to an image identification model established in advance specifically comprises: obtaining a specified area in the live broadcast picture; identifying if the target image element exists in the specified area according to the image identification model established in advance; and if the target image element exists in the specified area, determining that the target image element exists in the live broadcast picture. In this way, a calculation amount of feature values may be reduced.

In addition, the identifying if the target image element exists in the specified area specifically comprises: capturing a target area in the specified area according to a size of the target image element; inputting a feature value of the target area to the image identification model, and determining if the target image element exists in the target area according to an output result of the image identification model; and if the target image element does not exist in the target area, shifting a location of the target area according to a preset rule, and identifying if the target image element exists in the shifted target area. In this way, precision of image identification may be ensured, and the calculation amount for calculating the feature values is reduced, so that calculation efficiency of the feature values is improved.

In addition, the method further comprises performing the following step after the obtaining a specified area in the live broadcast picture: obtaining a greyscale map for the specified area; and identifying if the target image element exists in the specified area according to the image identification model established in advance specifically comprises: identifying if the target image element exists in the greyscale map according to the image identification model established in advance. Compared with a color image, the greyscale map has a higher distinction degree, so that the calculation amount of the feature values is reduced while the precision of image identification is ensured.

BRIEF DESCRIPTION OF THE DRAWINGS

One or more embodiments are exemplarily described by using figures in the accompanying drawings corresponding thereto. The exemplary descriptions do not constitute a limitation on the embodiments. Elements with a same reference numeral in the accompanying drawings represent similar elements. Unless otherwise particularly stated, the figures in the accompanying drawings do not constitute a limitation.

DETAILED DESCRIPTION

To make the objective, technical solutions, and advantages of the present disclosure clearer, the following further describes the embodiments of the present disclosure in details with reference to the drawings. Those skilled in the art would appreciate that in various embodiments of the present application, numerous technical details are set forth to provide the reader with a better understanding of the present application. However, the technical solutions claimed in the present application may be implemented without these technical details and various changes and modifications made based on the following embodiments.

Division of the embodiments below is for the convenience of description, which should not constitute any limitation on the specific implementation of the present disclosure, and the embodiments may be combined with each other and may be mutual referenced from other on the premise that they are not conflict with each other.

Figure 1:
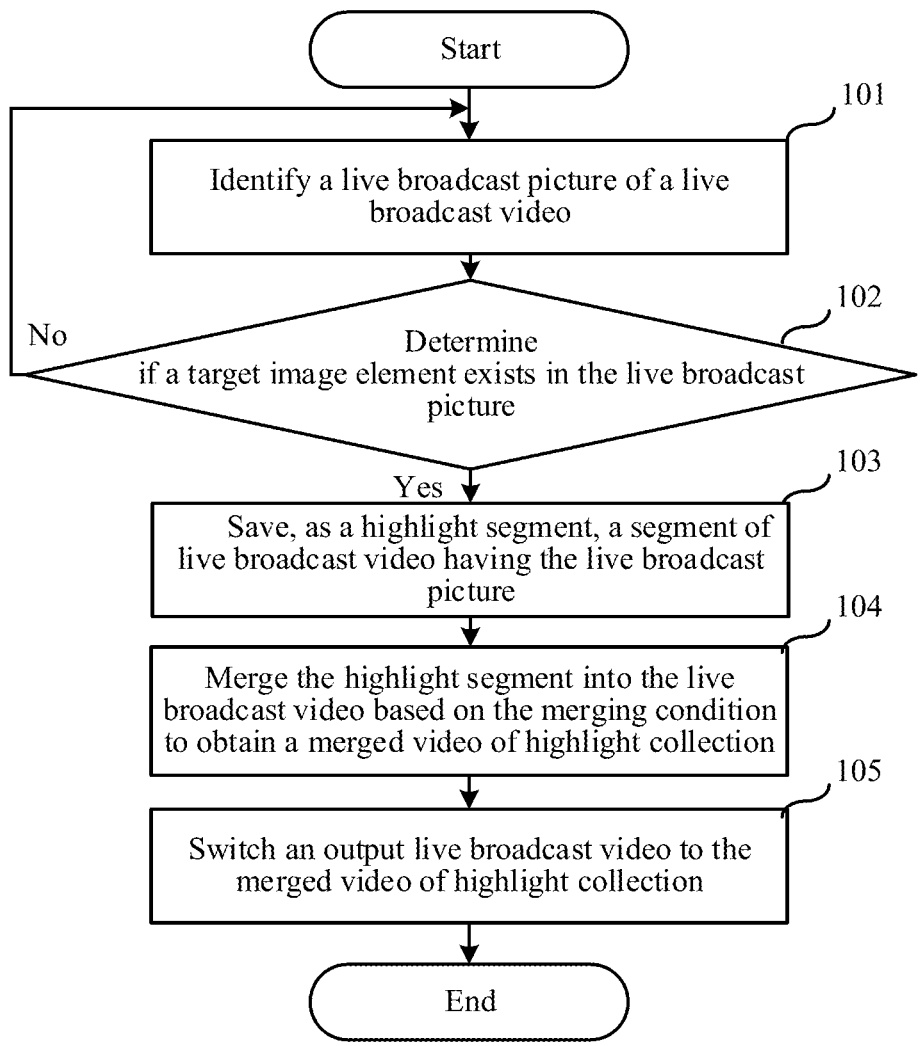
FIG. 1 is a flowchart of a method for generating a live broadcast video of highlight collection according to a first embodiment of the present disclosure.

A first embodiment of the present disclosure relates to a method for generating a live broadcast video of highlight collection, the method comprises: identifying a live broadcast picture from a live broadcast video and determining if a target image element exists in the live broadcast picture; if the target image element exists in the live broadcast picture, saving, as a highlight segment, a segment of live broadcast video having the live broadcast picture; when a merging moment is identified, merging the highlight segment into the live broadcast video according to the merging moment to obtain a merged video of highlight collection; and switching an output live broadcast video to a merged video of highlight collection. The following specifically describes implementation details of the method for generating a live broadcast video of highlight collection in this embodiment, and the following content provides implementation details for the convenience of understanding, which are not necessary for implementing this solution. A specific procedure is shown in FIG. 1.

Step 101, identifying a live broadcast picture from a live broadcast video. Specifically, when performing a video live broadcasting, the server receives the live broadcast video, processes the received live broadcast video, and output the processed live broadcast video to a client terminal for the client terminal to play the live broadcast video, so that the user could view the live broadcast video. When processing the received live broadcast video, the server decodes the received live broadcast video. The data of the decoded live broadcast video is a string of video frame sequences, and image identification of the live broadcast picture may be performed at a fixed time or frame by frame. In an actual application, the server may be a stream media server at a stream media service terminal. After compressing continuous audio and video information, the stream media server uploads the compressed audio and video information to a network server, so that the user may view the video while downloading the same, thereby improving viewing experience of the user.

Step 102, determining if a target image element exists in the live broadcast picture, and if the target image element exists in the live broadcast picture, the process goes to step 103, or if the target image element does not exist in the live broadcast picture, the process goes back to step 101. Specifically, the target image element in the live broadcast picture may be an identifier in the live broadcast picture that could represent the video content, for example, words such as "kill" or "succeed" or related icons presented in a picture for highlight moment during a game live broadcast; if the same or a similar identifier is presented, it is determined that the target image element exists in the live broadcast picture. In an actual application, the identification of the live broadcast picture and the determination on if the target image element exists in the live broadcast picture may be performed by using an image identification model. The highlight segment is autonomously identified by using the image identification model trained in advance, so that the highlight segment can be obtained more accurately and rapidly, thereby improving efficiency for editing the highlight segment and reducing consumption on human resources.

Step 103, saving, as a highlight segment, a segment of live broadcast video having the live broadcast picture. Specifically, when it is identified that the target image element exists in the live broadcast picture, the live broadcast video having the live broadcast picture is determined as the highlight segment; and a live broadcast video of preset duration may be selected as the highlight segment or a live broadcast video formed by several continuous frames of live broadcast pictures may be selected as the highlight segment.

The following specifically describes the identification of the live broadcast picture and the determination on if the target image element exists in the live broadcast picture by using an image identification model:

An image identification model is established in advance, and a large number of target image elements in video pictures that need to be identified are collected and pictures with the collected target image elements are taken as positive sample pictures for a training model. In addition, pictures with a large number of non-target image elements are collected as negative sample pictures for the training model, and the image identification model is trained by using the collected pictures.

A method for performing image identification by using a model is specifically as follows:

Firstly, a live broadcast video is decoded in real time to obtain a decoded frame. Pixel value capturing is performed on an area in each frame of a specified location and a specified size. During capturing, only a brightness component (greyscale map) of a live broadcast picture is captured but a chrominance component is discarded. Brightness generally has a distinction degree higher than that of chrominance, and therefore, the amount of calculation can be greatly reduced while ensuring the precision of identification. Secondly, the size of the captured greyscale map is adjusted, and a size (for example, 64×64) which is relatively small but would not be lack of many details may generally be selected. The size-adjusted greyscale map may have any height-to-width ratio, which does not affect basic features of the greyscale map. When training the image identification model, the training images may be adjusted to be the same size. In this way, the precision of image identification could be improved, and the amount of calculation is small and relatively stable. Then, a histogram of oriented gradient (HOG) calculation is performed on the size-adjusted images to obtain multidimensional feature representations. Finally, a pre-trained Support Vector Machine (SVM) model file is loaded, and the obtained multidimensional features are transferred to the model. A value obtained is a category sequence number corresponding to the currently captured area. The category sequence number may represent a category of the target image element. For example, a target image element "penta kill" corresponds to a category sequence number 001, and a target image element "success" corresponds to a category sequence number 002, and the like.

In the foregoing image identification process, locations, sizes and numbers selected for the specified areas may be preset. For example, a specified area may be selected from an upper left corner, a lower left corner, an upper right corner, or a lower right corner of the live broadcast picture, or any location in the middle of the live broadcast picture; or the entire live broadcast picture may be used as the specified area. Since in the live broadcast video, the target image element is generally fixed at a certain location of the live broadcast picture, for example, in a game live broadcast process, a word such as a target image element "penta kill" is generally presented at the lower left corner of the live broadcast picture. In order to ensure the identification precision for identifying the target image element and appropriately reduce the amount of calculation of the feature values, the specified area may be selected from locations where the target image element is generally presented, that is, the lower left corner of the live broadcast picture.

Figure 2:
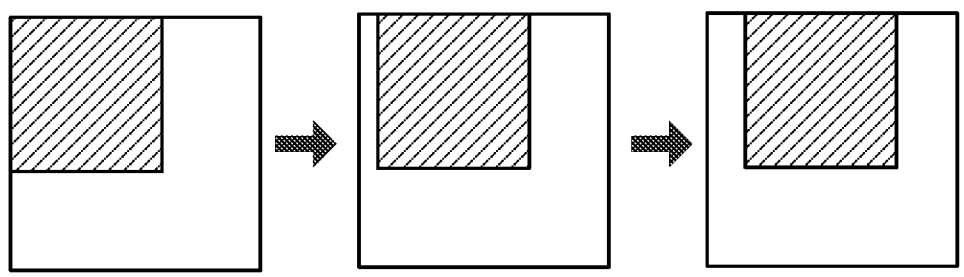
FIG. 2 is a schematic diagram of a process for selecting a target area according to the first embodiment of the present disclosure.

Specifically, a size selected for the specified area is generally greater than the size of the target image element. When identifying a specified area, a target area that has the same size as the target image element may be captured in the specified area, and then, it is identified if the target image element exists in the target area. If the target image element does not exist in the target area, the location of the target area is shifted according to a preset rule. The preset rule may be a rule of shifting the captured area by a distance of one pixel in any direction, or may be a rule of shifting the captured area by a distance of a specified interval in any direction. The process for selecting the target area is as follows: for example, the size of the target image element is 50 pixels*50 pixels, the size of an obtained specified area is 80 pixels*80 pixels, and an image having a size of 50 pixels*50 pixels is captured in the specified area as the target area. As shown in the left picture in FIG. 2, a target area (shadow area) having a size of 50 pixels*50 pixels is captured in a specified area (the square area having a white ground color), and if a target image element exists in the target area is determined by the image identification model. For example, a feature value of the target area is input to the image identification model, and if the target image element exists in the target area is determined according to an output result of the image identification model. If the target image element does not exist in the target area, the captured area is translated by a distance of a specified interval in any direction. As shown in the middle picture in FIG. 2, a second target area (shadow area) having a size of 50 pixels*50 pixels is captured. Similarly, a translation is performed sequentially by a specified distance in any direction according to the foregoing rule, until the target image element exists in the captured target area, or until the entire specified area is searched. The number of target areas captured at a specified interval is greatly reduced, but the calculation precision is somewhat affected. Therefore, in an actual application, a rapid algorithm may be employed to perform range searching. For example, after the target areas are captured by using ten pixels as an interval, a matching degree of matching between each target area and the target image element is calculated, and a target area having a high matching degree is selected and taken as a start point for a next-round precise searching. Based on the selected start point, a small-range of fine searching is performed, and a location having a higher matching degree is selected. For example, for a target area having a high matching degree, the specified interval is adjusted from ten pixels in the first round capturing process to five pixels in a second-round capturing process. In this case, the capturing result of the second-round capturing process is more precise, thereby improving a probability of locating a precise location at which the target image element is presented.

Step 104, merging the highlight segment into the live broadcast video according to a merging condition to obtain a merged video of highlight collection. Specifically, the merging condition is a moment when the user expects to playback the highlight segment. The moment may be a time when a game or a match ends, or a time for half-time break, for example, a moment after the first game ends and before the second game starts in a game live broadcast. Contents currently played in the live broadcast video at the merging moment are generally contents that the user does not focus on. The highlight segment is merged into the live broadcast video at the merging moment, and the merged video of highlight collection obtained after merging has the highlight segment therein, so that the user receives the highlight segment while viewing the not focused contents. Thus, the user may view playback of the highlight contents, and also avoid viewing the boring live broadcast video, thereby improving the user's experience of viewing the live broadcast video. The merging condition may also be that the number of highlight segment reaches a preset number, thus duration of the highlight segment may be controlled; and when the number of highlight segment reaches the preset number, a plurality of highlight segments are merged into the live broadcast video. By playing the merged video of highlight collection, the highlight segment may be provided for the user to view in time, thereby ensuring timeliness of playing the highlight segment.

In an actual application, whether the merging condition is satisfied may also be determined by identifying a picture using an image identification model. The image identification model is trained by using a large number of images that may be used as images presented at merging moments, and the images used in training process generally carry image elements representing contents not focused by the user, for example, image elements representing the end or the half-time break of the game or the match. The image identification model trained in this way may determine whether the merging condition is satisfied by identifying the currently played live broadcast video, and determine the merging moment according to the merging condition, that is, determining the timing when the highlight segment is merged into the live broadcast video. Determining the merging timing by using the image identification model may improve the efficiency of determining the merging timing, and reduce consumption on human resources. Moreover, it is ensured to a certain degree that the contents of the live broadcast video played at the merging moment are contents not focused by the user, thereby avoiding impact on viewing of the live broadcast video by the user.

Step 105, switching the output live broadcast video to the merged video of highlight collection. Specifically, the server outputs the video to the client terminal, and the client terminal presents contents of the video to the user. When the server outputs the live broadcast video, the video played on the client terminal is the live broadcast video. When the server outputs the merged video of highlight collection, the client terminal plays the merged video of highlight collection, and the user may view playback of the highlight segment.

After the output live broadcast video is switched to the merged video of highlight collection, whether a switching condition is satisfied may be further determined. When the switching condition is satisfied, the output merged video of highlight collection is switched to the live broadcast video. The determination on whether the switching condition is satisfied may comprises determining the remaining duration of the merged video of highlight collection; and if the merged video of highlight collection is played to the end, switching the output merged video of highlight collection to the live broadcast video, so that the user continuously views the live broadcast video. When the output merged video of highlight collection is switched to the live broadcast video, the first video frame of the live broadcast video after the switching is a key frame (the live broadcast video data takes a video frame sequence as a unit, and each video frame sequence includes one key frame and a plurality of non-key frames), and switching performed at the key frame may ensure that the video after the switching could be normally played, and problems such as data loss and incapable of identifying of video data will be avoided.

Compared with the prior art, in this embodiment of the present disclosure, during live broadcast, the server identifies if the target image element exists in the live broadcast picture. When the target image element is identified, it indicates that the live broadcast picture has a feature for a picture of a highlight moment, and it may be determined that a live broadcast segment having the live broadcast picture is a highlight segment; when a merging condition is identified by the server, the identified and saved highlight segment is merged into the live broadcast video to obtain the live broadcast video of highlight collection, and the merged live broadcast video of highlight collection is output, so that in a live broadcast viewing process, the user may also view the highlight collection played in the live broadcast video, thereby improving timeliness of playing of a highlight collection video. Moreover, during editing, it is not necessary to identify highlight segment manually, thereby saving a lot of human resources and solving the problem of low efficient manual editing.

Figure 3:
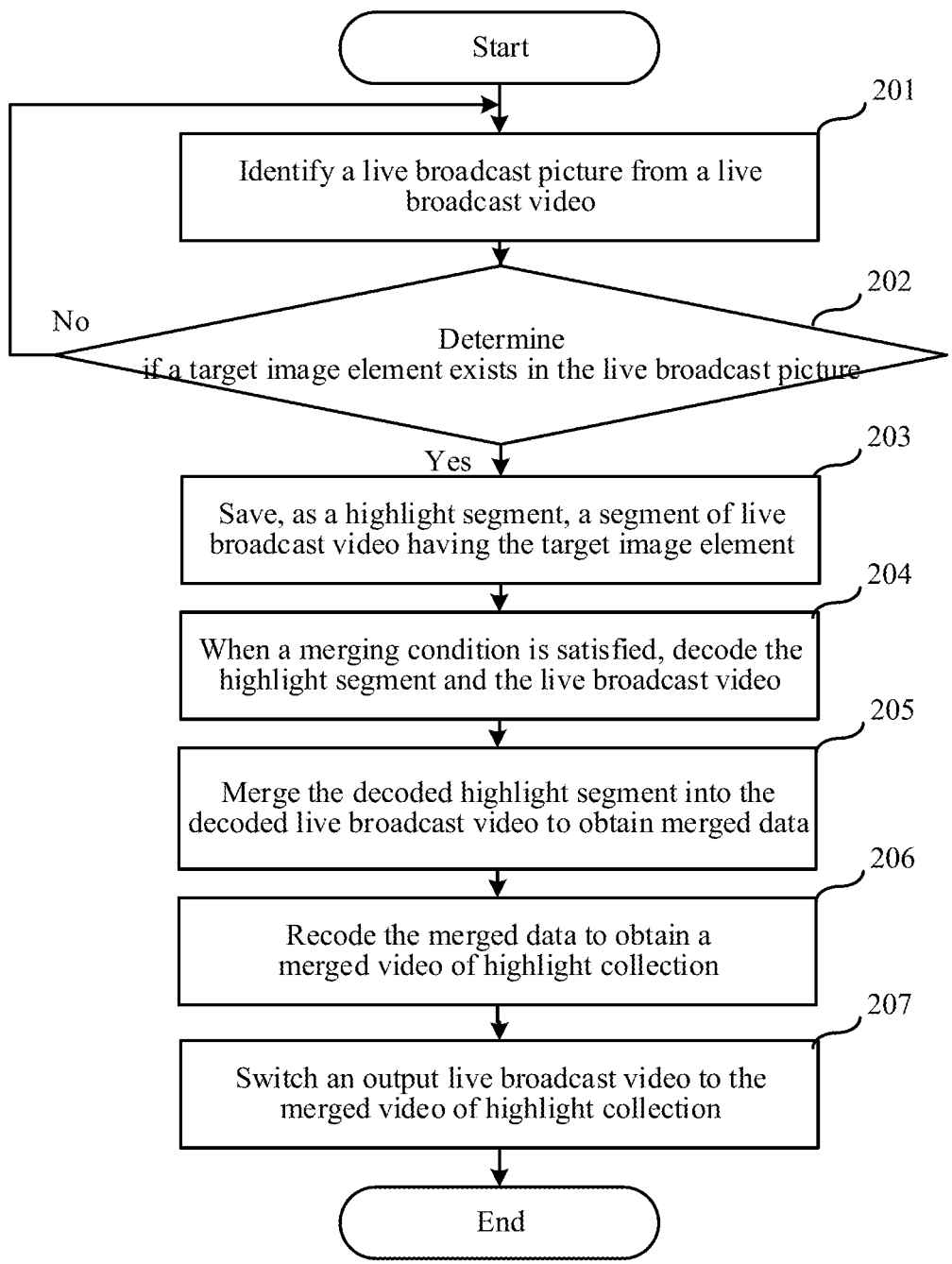
FIG. 3 is a flowchart of a method for generating a live broadcast video of highlight collection according to a second embodiment of the present disclosure.

A second embodiment of the present disclosure relates to a method for generating a live broadcast video of highlight collection. The second embodiment further refines the first embodiment, and details of the refinement lie in that: in the second embodiment of the present disclosure, the highlight segment is decoded and the live broadcast video is decoded; the decoded highlight segment is merged into the decoded live broadcast video to obtain merged data; and the merged data is recoded to obtain a merged video of highlight collection. A specific flowchart is shown in FIG. 3.

Step 201, identifying a live broadcast picture from a live broadcast video.

Step 202, determining if a target image element exists in the live broadcast picture; and if yes, the process proceeds to step 203, otherwise, the process goes back to step 201.

Step 203, saving, as a highlight segment, a segment of live broadcast video having the live broadcast picture.

Steps 201 to 203 are consistent with steps 101 to 103 in the first embodiment, and thus are not described herein again.

Step 204, when a merging condition is satisfied, decoding the highlight segment and the live broadcast video. Specifically, data is restored to contents represented by the data according to a decoding manner corresponding to the encoding manner. Video data obtained after the decoding is classified into audio data and video data. The video data is a string of video frame sequences, and each video frame sequence may represent one picture or one action. After the decoding, the processing of the picture in the video is facilitated.

Step 205, merging the decoded highlight segment into the decoded live broadcast video to obtain merged data. Specifically, the decoded highlight segment may be classified into audio data and video data, and similarly, the decoded live broadcast video may also be classified into audio data and video data. The audio data of the highlight segment and the audio data of the live broadcast video are merged and the video data of the highlight segment and the video data of the live broadcast video are merged, and the merged audio data and video data are collectively referred to as merged data.

During merging of the audio data, an audio stream of the decoded highlight segment and an audio stream of the decoded live broadcast video may be merged by means of audio mixing, so as to obtain merged audio data. Specifically, the audio data of the live broadcast video is obtained, and a volume thereof is adjusted; the audio data of the highlight segment is obtained, and a volume is adjusted; and audio mixing is performed on the two pieces of adjusted audio data to form a merged audio stream. In this way, the user may hear the audio of the live broadcast video and the audio of the highlight segment at the same time, so that the user may obtain all information of the played video. Different audio data after the audio mixing may be played by using different sound channels; alternatively, either audio data of the live broadcast video or the audio of the highlight segment is taken as primary audio while the other audio data is taken as the background. A specific manner for audio mixing is not limited herein.

During merging of the video data, each video frame of the decoded highlight segment and each video frame of the decoded live broadcast video may be merged in a preset mode, so as to obtain the merged video data. The preset mode may be a coverage mode or a parallel mode. Specifically, each video frame of the live broadcast video may be reduced to a small window for a client terminal to play the video, and each video frame of the highlight segment are taken as a background for the client terminal to play the video, and the reduced each video frame of the live broadcast video is covered on a position of each video frames in the highlight segment, for example, a left upper corner or a right lower corner of each video frame of the highlight segment. In this way, when viewing a video of a highlight segment, the user will not miss live broadcast information played in the live broadcast video. It should be noted that, merging of video images may also be implemented by employing different size modes. For example, each video frame of the highlight segment is reduced and covered on each video frame of the live broadcast video, and the highlight segment is played through a small window; or the live broadcast video and the highlight segment may be displayed and played in parallel by using windows of the same size, and details are not described herein again.

Step 206, recoding the merged data to obtain a merged video of highlight collection. Specifically, the merged data is encoded in a preset encoding manner. In this way, the merged video of highlight collection could be conveniently transmitted and data loss in the transmission process is avoid; and the encoded data may further be compressed after encoding, so as to reduce memory space occupied in a transmission process, thereby improving data transmission efficiency.

Step 207, switching the output live broadcast video to the merged video of highlight collection. This step is consistent with steps 105 in the first embodiment, and thus is not described herein again.

In this embodiment, after the decoding operation, the highlight segment is merged into the live broadcast video and the stability of the merged video is ensured. While merging the video data of the highlight segment into the video data of the live broadcast video, the audio data of the highlight segment is merged into the audio data of the live broadcast video. In this way, the user could hear the audio of both the live broadcast video and the highlight segment at the same time, so that the user may obtain all information of the played video, thereby improving user's viewing experience. The merged data of the highlight segment and the live broadcast video is recoded and compressed, thereby reducing storage space of the merged video of highlight collection.

Figure 4:
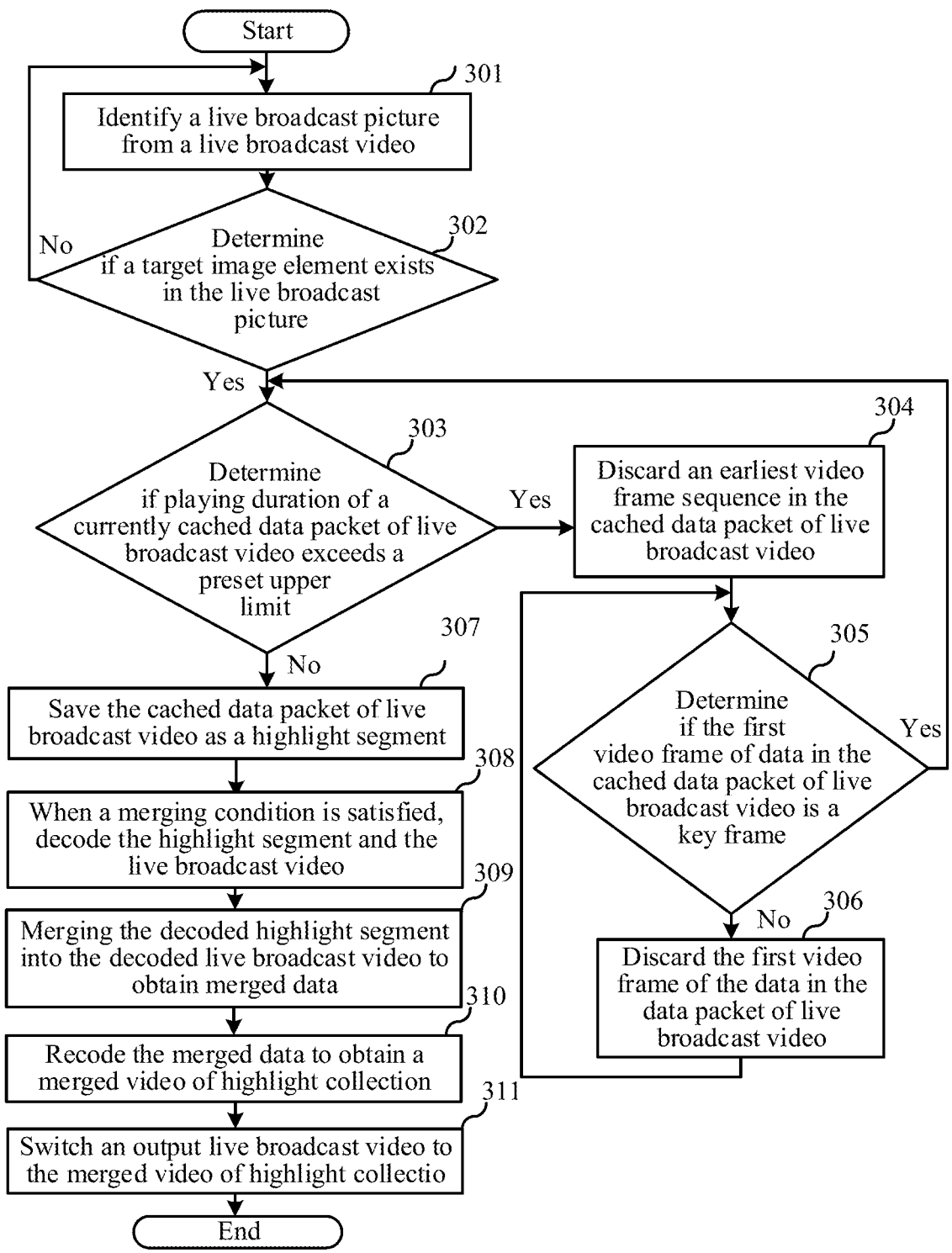
FIG. 4 is a flowchart of a method for generating a live broadcast video of highlight collection according to a third embodiment of the present disclosure.

A third embodiment of the present disclosure relates to a method for generating a live broadcast video of highlight collection. The third embodiment is improved based on the second embodiment, and the improvement lies in that: in the third embodiment of the present disclosure, a data packet of the live broadcast video is cached during the live broadcast, and when the target image element is identified, the cached data packet of the live broadcast video is saved as the highlight segment. A specific flowchart is shown in FIG. 4.

Step 301, identifying a live broadcast picture from a live broadcast video.

Step 302, determining if a target image element exists in the live broadcast picture; and if yes, the process proceeds to step 303; otherwise, the process goes back to step 301.

Steps 301 and 302 are consistent with steps 201 and 202 in the second embodiment, and thus are not described herein again.

Step 303, determining if a playing duration of a cached data packet of the live broadcast video exceeds a preset upper limit, and if the preset upper limit is exceeded, the process proceeds to step 303; otherwise, the process proceeds to step 307. Specifically, during the live broadcasting, a data packet of the live broadcast video is cached in real time, and whether the target image element exists in the live broadcast picture of the live broadcast video is determined simultaneously; when the target image element is identified, whether the playing duration of the currently cached data packet of the live broadcast video exceeds the preset upper limit is determined. Duration of the cached data is calculated according to a timestamp of the cached data; whether the calculated duration of the cached data exceeds the preset upper limit is determined; and if the preset upper limit is exceeded, a part of data of the cached data packet of the live broadcast video is discarded, or if the preset upper limit is not exceeded, it indicates that the cached data packet of the live broadcast video satisfies a length requirement for the video of highlight segment, and the cached data packet of the live broadcast video is saved as the highlight segment.

Step 304, discarding an earliest video frame sequence in the cached data packet of the live broadcast video. Specifically, the data of the cached data packet of the live broadcast video is sequentially discarded from front to back according to a time order of the video frame sequences. In this way, timeliness of the highlight segment could be ensured, ensuring that the highlight segment is a segment most impressive to the user.

Step 305, determining if the first video frame of data in the cached data packet of the live broadcast video is a key frame, and if yes, the process goes back to step 303, otherwise, the process proceeds to step 306. Specifically, the first video frame of the cached data packet of the live broadcast video being the key frame would ensure that the first video frame in the stored highlight segment is the key frame. The first video frame in the obtained highlight segment being the key frame may ensure the operations of decoding, merging, encoding, and switching are normally performed, so as to avoid a problem occurred while playing the merged video of highlight collection formed by the highlight segment due to an incorrect operation.

Step 306, discarding the first video frame in the data packet of the live broadcast video. Specifically, when the first video frame of the data in the data packet of the live broadcast video is a non-key frame, the non-key frame is discarded, thereby ensuring that the key frame is used as the first video frame of the data packet of the live broadcast video.

Step 307, saving the cached data packet of the live broadcast video as the highlight segment.

Step 308, decoding the highlight segment and the live broadcast video, when a merging condition is satisfied.

Step 309, merging the decoded highlight segment into the decoded live broadcast video to obtain merged data.

Step 310, recoding the merged data to obtain a merged video of highlight collection.

Step 311, switching the output live broadcast video to the merged video of highlight collection.

Steps 308 to 311 are consistent with steps 204 to 207 in the second embodiment, and thus are not described herein again.

In this embodiment, the length of the highlight segment is controlled, the memory required for saving the highlight segment is reduced, and the operation for merging may be simplified, thereby improving efficiency of obtaining the merged video of highlight collection. In addition, when the duration of the cached data packet of the live broadcast video exceeds the preset upper limit, the cached data is sequentially discarded from front to back by using a video frame sequence as a unit. In addition, it is ensured that the first video frame of the cached data packet of the live broadcast video is the key frame, so that the highlight segment may be successfully merged, and the video is normally played, thereby avoiding content loss in the played merged video of highlight collection.

Figure 5:
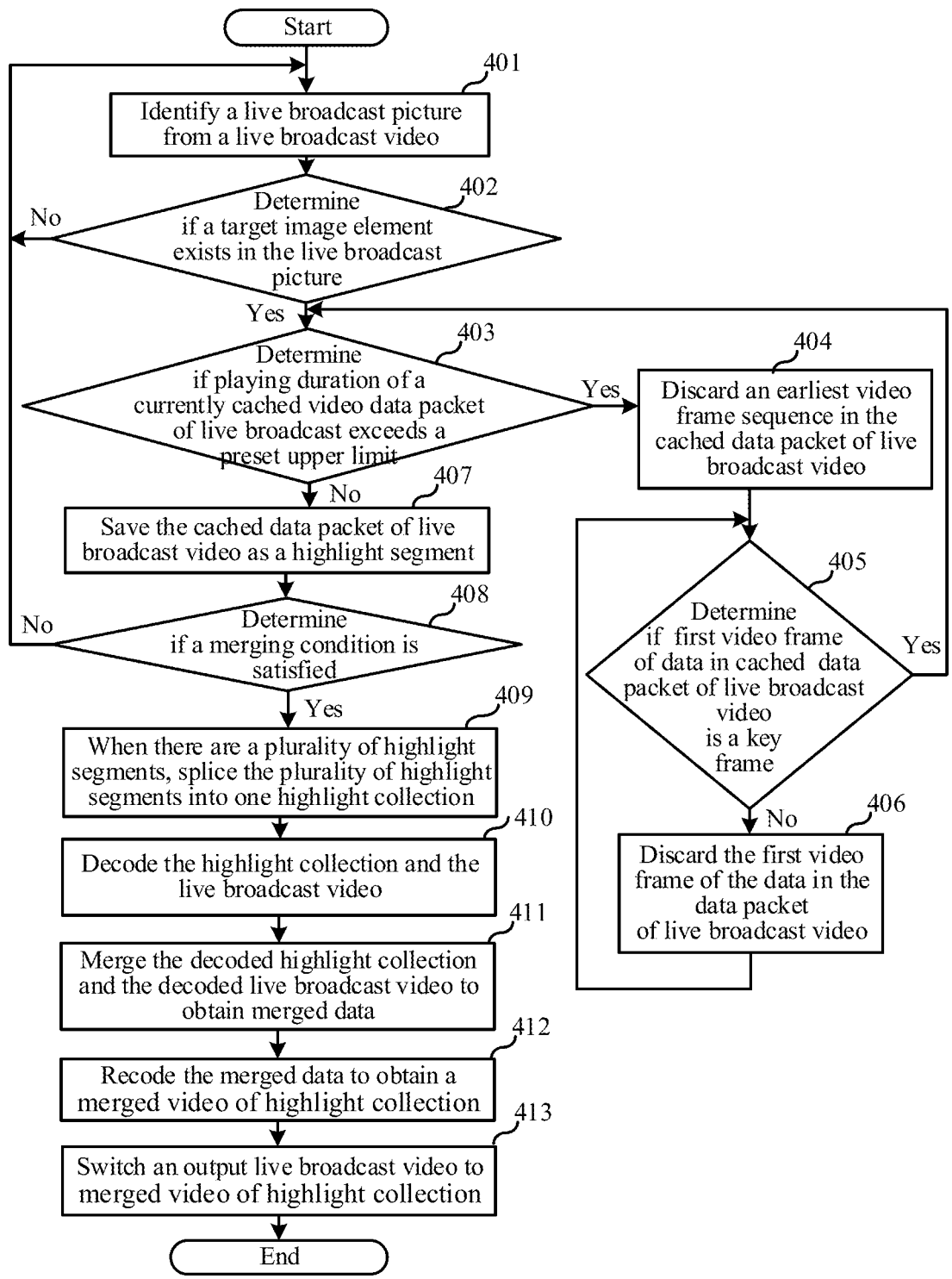
FIG. 5 is a flowchart of a method for generating a live broadcasts video highlight collection according to a fourth embodiment of the present disclosure.

A fourth embodiment of the present disclosure relates to a method for generating a live broadcast video of highlight collection. The fourth embodiment is improved based on the third embodiment, and the improvement lies in that: in the fourth embodiment of the present disclosure, a plurality of highlight segments are spliced into one highlight collection, and an editing is performed on the highlight collection. A specific flowchart is shown in FIG. 5.

Step 401, identifying a live broadcast picture from a live broadcast video.

Step 402, determining if a target image element exists in the live broadcast picture, and if yes, the process proceeds to step 403, otherwise, the process goes back to step 401.

Step 403, determining if a playing duration of a cached data packet of the live broadcast video exceeds a preset upper limit, and if the preset upper limit is exceeded, the process proceeds to step 404, otherwise, the process proceeds to step 407.

Step 404, discarding an earliest video frame sequence in the cached data packet of the live broadcast video.

Step 405, determining if the first video frame of data in the cached data packet of the live broadcast video is a key frame, and if yes, the process goes back to step 403, otherwise, the process proceeds to step 406.

Step 406, discarding the first video frame in the data packet of the live broadcast video.

Step 407, saving the cached data packet of the live broadcast video as the highlight segment.

Steps 401 to 407 are consistent with steps 301 to 307 in the third embodiment, and thus are not described herein again.

Step 408, determining whether a merging condition is satisfied; and if yes, the process proceeds to step 409, otherwise, the process goes back to step 401. Specifically, the merging moment is identified by using the image identification model trained in advance. The merging condition may be a moment when the user does not focus on the current live broadcast content, for example, a time period after a moment that the first game ends but before a moment that the second game begins. Generally, the user is immersed in content of the last game, but does not focus on the beginning of the second game. Before the merging moment is identified, there may be one or more highlight segments in the live broadcast video, and the plurality of identified highlight segments may be inconsecutive in time. Therefore, when these highlight segments are merged into the live broadcast video, the plurality of highlight segments have to be processed in advance, so that the user may view continuous video, and problems such as freezing and rolling back will not occur.

Step 409, when there are a plurality of highlight segments, splicing the plurality of highlight segments into one highlight collection. Specifically, before a plurality of highlight segments are spliced, each highlight segment may be edited. For example, each video frame picture of the highlight segment is clipped to remove unimportant part of the picture so as to highlight the highlighted content. Other dotted elements for a picture, such as, an animation effect and narrator words, may be further added to the picture, to make the highlight picture more vivid and interesting. After the highlight segment is edited, the highlight segment may need to be further adjusted according to a timestamp of video data of the highlight segment, and a playing duration of the highlight segment is reduced by adjusting the multiple of the playing speed, so as to make the content of the highlight segment more compact.

After each highlight segment is processed, the plurality of highlight segments are spliced into one highlight collection. A time order for playing the plurality of highlight segments may be determined according to a timestamp of each highlight segment, and splicing is performed according to the time order represented by the timestamp, so that different segments may be connected more fluently. For example, the first highlight segment is formed by editing the live broadcast video from 3 minutes 10 seconds to 3 minutes 25 seconds, the second highlight segment is formed by editing the live broadcast video from 5 minutes 15 seconds to 5 minutes 40 seconds, and the two highlight segments are spliced to obtain a highlight collection having a time length of 40 seconds. The first 15 seconds of the highlight collection is the first highlight segment, and the last 25 seconds of the highlight collection is the second highlight segment. In this way, after the first highlight segment is played to the end, the second highlight segment is immediately played, which improves the fluency of the video connection and ensures continuous playing of the plurality of highlight segments.

Step 410, decoding the highlight collection and the live broadcast video.

Step 411, merging the decoded highlight collection and the decoded live broadcast video to obtain merged data.

Step 412, recoding the merged data to obtain a merged video of highlight collection.

Step 413, switching an output live broadcast video to the merged video of highlight collection.

Steps 410 to 413 are consistent with steps 308 to 311 in the third embodiment, and thus are not described herein again.

In this embodiment, each of the highlight segment is edited; timestamp recovery is performed on each of the edited highlight segment; and each of the highlight segment on which the timestamp recovery are performed are spliced into one highlight collection according to a timestamp order. In this way, continuous playing of the plurality of highlight segments can be ensured, thereby improving a fluency of connection of the plurality of highlight segments.

Figure 6:
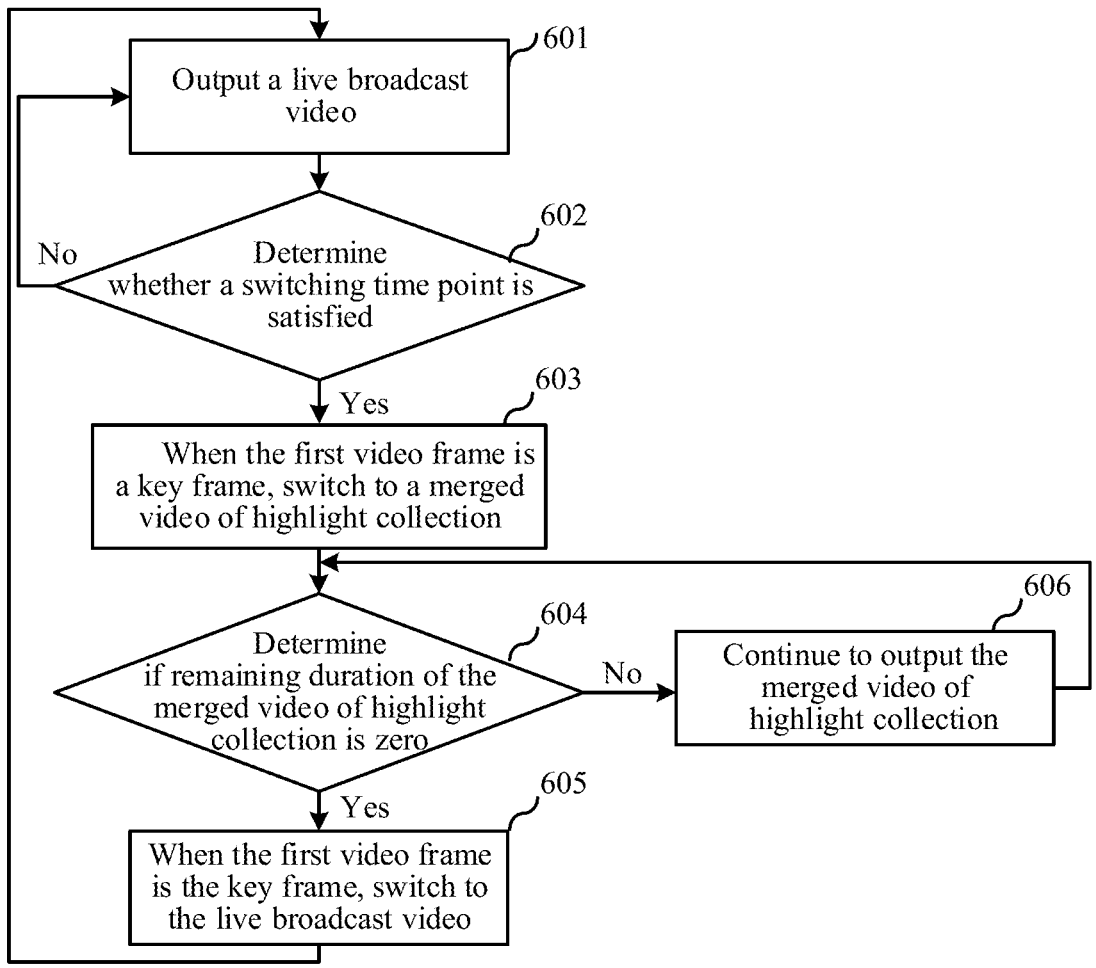
FIG. 6 is a flowchart of a method for performing mutual switching between a live broadcast video and a highlight segment according to the fourth embodiment of the present disclosure.

In an actual application, to ensure continuity of video playing, switching between the live broadcast video and the merged video of highlight collection has to be performed. A specific procedure is shown in FIG. 6.

Step 601, outputting a live broadcast video.

Step 602, determining whether a switching time point is satisfied; and if yes, the process proceeds to step 603, otherwise, the process goes back to step 601. Specifically, a video that needs to be live broadcast may be cached in advance in a stream media server during outputting the live broadcast video. For example, after a live broadcast video queue having a length of 100 frames is cached in a cache queue, the first frame in the cache queue is output to a client terminal. Assuming that merging is started at the 101st frame of the live broadcast video, that is, a timestamp of the first video frame of a current merged video of highlight collection is the same as a timestamp of the 100th frame in the cache queue of the live broadcast video. When switching the output live broadcast video to the merged video of highlight collection, a switching time point for the merged video of highlight collection is set to be the timestamp of the 100th frame of the live broadcast video, so as to ensure continuity of video playing. When the merging is completed, if the live broadcast video output by the stream media server to the client terminal is the 80th frame, that is the switching time point is not reached at this time (that is, the timestamp of the 100th frame is not reached), the live broadcast video is continuously played, until the switching time point is reached, and then the currently output live broadcast video is switched to the merged video of highlight collection.

Step 603, switching to a merged video of highlight collection when the first video frame is a key frame.

Step 604, determining whether the remaining duration of the merged video of highlight collection is zero, and if yes, the process proceeds to step 605, otherwise the process proceeds to step 606. Specifically, if the remaining duration of the merged video of highlight collection is not zero, it indicates that the playing of the merged video of highlight collection is not finished, and the merged video of highlight collection has to be continuously played. When the remaining duration is zero, to ensure continuity of video playing, the video has to be switched, thereby avoiding a blank presented while the video playing.

Step 605, switching to the live broadcast video when the first video frame is the key frame.

Step 606, continuing to output the merged video of highlight collection until remaining duration of the merged video of highlight collection is zero.

Figure 7:
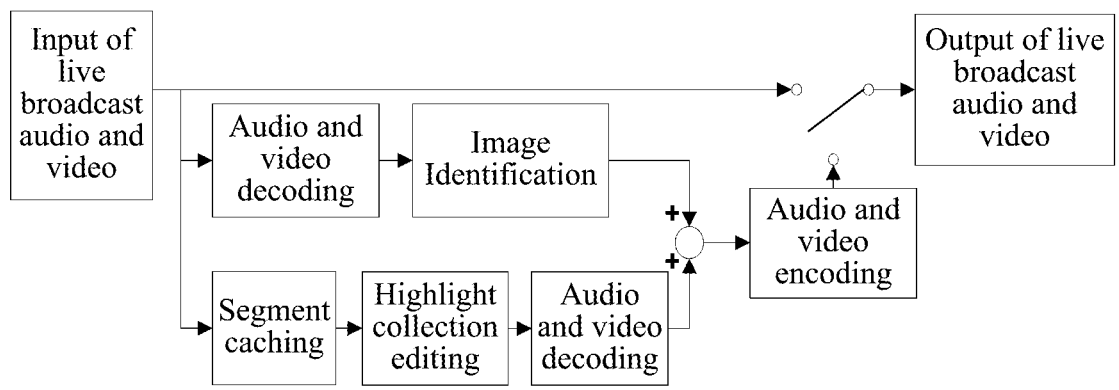
FIG. 7 is a schematic diagram of a process for a server to process data of a live broadcast video according to the fourth embodiment of the present disclosure.

The following specifically describes the obtaining of the merged video of highlight collection by taking a game live broadcast as an example. A process of processing the live broadcast video data is shown in FIG. 7.

Video live broadcast data of the game live broadcast is output by a server to a client terminal, and the client terminal provides a window for the user to view the game live broadcast. The present disclosure relates to a processing on the video data by the server, so that the processed data could be directly played by the client terminal for the user. When receiving audio and video data of the game live broadcast, the server places a packet of received audio and video data into a cache queue, decodes the received game audio and video, and performs image identification on the decoded video picture by using a first image identification model; when the target image element is identified, it indicates that a currently played live broadcast video comprises contents focused by the user, for example, a successful kill or a highlighted displacement presented in the game live broadcast. Pictures with these contents are saved as a highlight segment. During saving of the highlight segment, whether duration of the cached data in the cache queue (the audio and video data packet in the cache queue) exceeds a preset upper limit may be determined according to a timestamp. When the preset upper limit is exceeded, a part of the cached data in the cache queue is discarded, so that the duration of the cached data is within the preset upper limit, and the cached data of the game live broadcast is saved as the highlight segment. When a plurality of highlight segments are saved, the plurality of highlight segments are spliced into one highlight collection.

The obtained highlight segment or highlight collection has to be played at the merging moment. When the merging moment is identified, the highlight segment or the highlight collection is decoded, and a live broadcast video after the merging moment is decoded at the same time, and the decoded live broadcast video and highlight segment (or highlight collection) are merged into a merged video of highlight collection. The merged video of highlight collection includes not only the highlight segment but also the live broadcast video. When the live broadcast video output by the server reaches the merging moment, the output live broadcast video is switched to the merged video of highlight collection, so that the user views the highlight segment already played in the live broadcast video while viewing the live broadcast video. In addition, if the user needs to particularly focus on the highlight segment, the user may select the highlight segment as a background of video playing, and the live broadcast video is displayed in a small window; and similarly, if the user focuses on the live broadcast video, the user may use the live broadcast video as a background and displays the highlight segment in a small window; or the two pieces of video contents may be displayed in parallel. A specific display manner is determined according to a specific situation, which is not limited herein.

When the playing of the merged video of highlight collection is completed, that is, the remaining duration of the merged video of highlight collection is zero, the server switches the output merged video of highlight collection to the live broadcast video, so as to ensure continuity of video playing.

Division of steps of the foregoing methods is made for the purpose of clear description, and during implementation, the steps may be combined into one step or some steps may be split into a plurality of steps. Provided that a same logical relationship is included, the division falls within the protection scope of this patent application. Unnecessary modifications or unnecessary designs added/introduced to an algorithm or a procedure also fall within the protection scope of this patent application as long as a core design of the algorithm or the procedure is not change.

Figure 8:
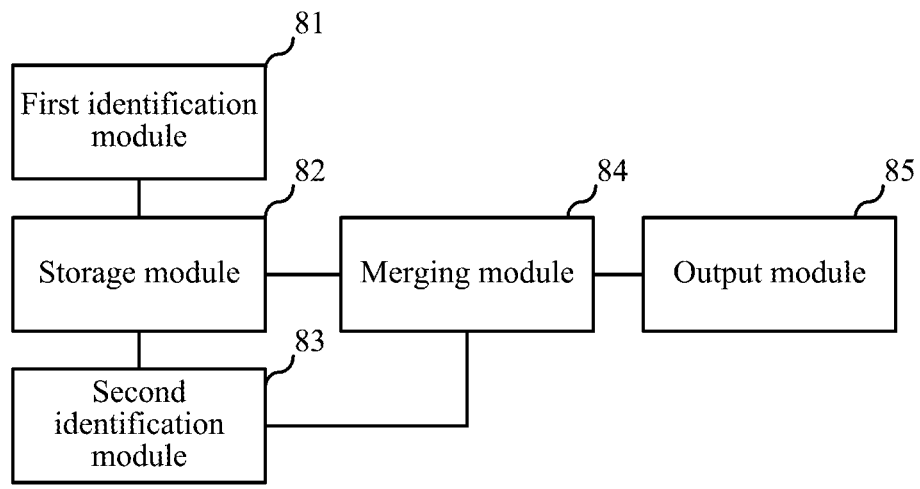
FIG. 8 is a schematic structural diagram of an apparatus for generating a live broadcast video of highlight collection according to a fifth embodiment of the present disclosure.

A fifth embodiment of the present disclosure relates to an apparatus for generating a live broadcast video of highlight collection. As shown in FIG. 8, the apparatus includes: a first identification module 81, a storage module 82, a second identification module 83, a merging module 84, and an output module 85, wherein, the first identification module 81 is configured for identifying a live broadcast picture from a live broadcast video and determining if a target image element exists in the live broadcast picture; the storage module 82 is configured for saving, as a highlight segment, a segment of live broadcast video having the live broadcast picture, if the target image element exists in the live broadcast picture; the second identification module 83 is configured for identifying if a merging condition is satisfied; the merging module 84 is configured for merging the highlight segment into the live broadcast video based on the merging condition to obtain a merged video of highlight collection, when the merging condition is satisfied; and the output module 85 is configured for switching an output live broadcast video to the merged video of highlight collection.

In addition, the apparatus for generating a live broadcast video of highlight collection may further include a decoding module and an encoding module. The decoding module is configured to decode the highlight segment, and decode the live broadcast video. The merging module is specifically configured to merge the decoded highlight segment with the decoded live broadcast video to obtain merged data; and the encoding module is configured to recode the merged data to obtain the merged video of highlight collection.

In addition, the merged data may include merged video data and merged audio data; and the merging module is specifically configured to merge each video frame of the decoded highlight segment and each video frame of the decoded live broadcast video in a preset mode, to obtain the merged video data; and merge an audio stream of the decoded highlight segment and an audio stream of the decoded live broadcast video by means of audio mixing to obtain the merged audio data.

In addition, the apparatus for generating a live broadcast video of highlight collection may further include a cache module. The cache module is configured to cache a data packet of the live broadcast video in real time; and the storage module is specifically configured to save the currently cached data packet of the live broadcast video as the highlight segment.

In addition, the storage module is further configured to discard a part of data in the cached data packet of the live broadcast video, when the playing duration of the currently cached data packet of the live broadcast video exceeds a preset upper limit, and save the data packet of the live broadcast video after the discarding as the highlight segment.

In addition, the storage module is specifically configured to: when discarding a part of data in the cached data packet of the live broadcast video, sequentially discarding, according to a playing order of the data packet of the live broadcast video, video frame sequences in the currently cached data packet of the live broadcast video from front to back, until the playing duration of the cached data packet of the live broadcast video obtained after the discarding does not exceed the preset upper limit.

In addition, the data packet of the live broadcast video stored in the storage module is specifically a cached data packet of the live broadcast video in which the first video frame is a key frame.

In addition, the apparatus for generating a live broadcast video of highlight collection may further include a splicing module. The splicing module is configured to splice, if the number of the highlight segment is more than one, a plurality of highlight segments into one highlight collection; and the merging module is specifically configured to merge the highlight collection into the live broadcast video.

In addition, the splicing module is further configured to edit each of the highlight segment; perform timestamp recovery on each of the edited highlight segment; and splice each of the highlight segment on which the timestamp recovery is performed into one highlight collection according to a timestamp order.

In addition, the output module is specifically configured to switch the output video from the live broadcast video to the merged video of highlight collection, when the timestamp of the live broadcast video satisfies the switching time point.

In addition, the output module is further configured to switch the output merged video of highlight collection to the live broadcast video, when the remaining duration of the merged video of highlight collection is zero.

In addition, the output module is further configured to switch the output merged video of highlight collection to the live broadcast video, when the remaining duration of the merged video of highlight collection is zero and the first video frame of the live broadcast video is determined as the key frame.

In addition, the first identification module specifically identifies a live broadcast picture and determines if a target image element exists in the live broadcast picture according to an image identification model established in advance, where the image identification model is trained according to collected image features.

In addition, the first identification module is specifically configured to obtain a specified area in the live broadcast picture; identify, according to the image identification model established in advance, if the target image element exists in the specified area; and determine that the target image element exists in the live broadcast picture if the target image element exists in the specified area.

In addition, when identifying if the target image element exists in the specified area, the first identification module is specifically configured to capture a target area in the specified area according to a size of the target image element; input a feature value of the target area to the image identification model, and determine, according to an output result of the image identification model, if the target image element exists in the target area; and if the target image element does not exist in the target area, shift a location of the target area according to a preset rule, and identify if the target image element exists in the shifted target area.

In addition, the first identification module is further configured to obtain a greyscale map of the specified area; and identify, according to the image identification model established in advance, if the target image element exists in the greyscale map.

Compared with the prior art, in the embodiments of the present disclosure, the user may view the highlight segment played in the live broadcast video while viewing the live broadcast, thereby improving timeliness of playing of the merged video of highlight collection. Moreover, during editing, the highlight segment does not need to be manually edited, thereby saving a lot of human resources and resolving a problem of low efficient manual editing.

It is not difficult to find that, this embodiment is an apparatus embodiment corresponding to the first embodiment, and thus it may be implemented in cooperation with the first embodiment. Related technical details mentioned in the first embodiment are still valid in this embodiment, and details are not described herein again in order to avoid repetition. Correspondingly, the related technical details mentioned in this embodiment may also be applied to the first embodiment.

It should be noted that, the various modules in this embodiment are logical modules, and in an actual application, a logical unit may be a physical unit, or may be a part of a physical unit, or may be implemented by a combination of a plurality of physical units. In addition, to highlight a creative part of the present disclosure, units not closely related to the technical problem proposed in the present disclosure are not introduced in this embodiment. However, it does not indicate that there are no other units in this embodiment.

Figure 9:
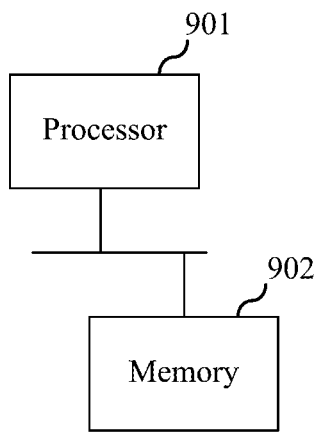
FIG. 9 is a schematic structural diagram of a server according to a sixth embodiment of the present disclosure.

A sixth embodiment of the present disclosure relates to a server. As shown in FIG. 9, the server includes at least one processor 901; and a memory 902 communicatively connected with the at least one processor 901, where the memory 902 stores an instruction executable by the at least one processor 901, and the instruction is executed by the at least one processor 901, so that the at least one processor 901 is capable of implementing the method for generating a live broadcast video of highlight collection described above.

The memory and the processor are connected by using a bus, the bus may include any number of mutually connected buses and bridges, and the bus connects one or more processors with various circuits of the memory. The bus may further connect various other circuits such as a peripheral device, a voltage regulator, and a power management circuit, which are well known in the art, and therefore will not further described. The bus interface provides an interface between the bus and a transceiver. The transceiver may be one element, or may be a plurality of elements, for example, a plurality of receivers and transmitters, which provides units configured to communicate with various other apparatuses. Data processed by the processor is transmitted over a wireless media by using an antenna, and the antenna further receives the data and transfers the data to the processor.

The processor is in charge of bus managing and general processing, and may further provide various functions, including timing, a peripheral interface, voltage adjustment, power supply management, and other control functions. The memory may be configured to store data used when the processor performs an operation.

A seventh embodiment of the present disclosure relates to a computer readable storage medium storing a computer program therein. When the computer program is executed by a processor, the foregoing method embodiments are implemented.

That is, a person skilled in the art may understand that all or some of the steps in the foregoing method embodiments may be implemented by related hardware instructed through a program. The program is stored in one storage medium, and includes several instructions to cause a device (which may be a single-chip microcomputer, a chip, or the like) or the processor to perform all or some of the steps in the methods in the embodiments of the present disclosure. The foregoing storage medium includes various media that may store program code, for example, a USB flash drive, a removable hard disk, a read-only memory (ROM), a random access memory (RAM), a magnetic disk, or an optical disc.

Those skilled in the art may understand that the foregoing embodiments are specific embodiments for implementing the present disclosure, and various modifications may be made to the embodiments in forms and in details during actual application without departing from the spirit and scope of the present disclosure.

What is claimed is:

1. A method for generating a live broadcast video of highlight collection, comprising:
   identifying a live broadcast picture from a live broadcast video and determining if a target image element exists in the live broadcast picture;
   if the target image element exists in the live broadcast picture, saving, as a highlight segment, a segment of the live broadcast video having the live broadcast picture;
   when a merging condition is satisfied, merging the highlight segment into the live broadcast video based on the merging condition to obtain a merged video of highlight collection; and
   switching an output live broadcast video to the merged video of highlight collection;
   wherein the identifying a live broadcast picture and determining if a target image element exists in the live broadcast picture specifically comprises:
   autonomously identifying the live broadcast picture and autonomously determining if the target image element exists in the live broadcast picture, according to an image identification model established in advance, wherein the image identification model is established by training according to collected image features;
wherein the merging condition is autonomously determined according to the image identification model; and
wherein the merging the highlight segment into the live broadcast video based on the merging condition to obtain a merged video of highlight collection comprises:
decoding the highlight segment, and decoding the live broadcast video;
merging each video frame of the decoded highlight segment with each video frame of the decoded live broadcast video in a preset mode, to obtain merged video data; and
recoding the merged video data to obtain the merged video of highlight collection, such that the merged video of highlight collection displays the live broadcast video and the highlight segment simultaneously.

2. The method for generating a live broadcast video of highlight collection according to claim 1, wherein the merged data comprises: merged video data and merged audio data; and
the merging the decoded highlight segment into the decoded live broadcast video specifically comprises: merging an audio stream of the decoded highlight segment and an audio stream of the decoded live broadcast video in form of audio mixing, to obtain the merged audio data.

3. The method for generating a live broadcast video of highlight collection according to claim 1, wherein, the method further comprises performing the following steps before the determining if a target image element exists in the live broadcast picture: caching a data packet of the live broadcast video in real time; and
the saving, as a highlight segment, a segment of live broadcast video having the live broadcast picture specifically comprises: saving a currently cached data packet of the live broadcast video as the highlight segment.

4. The method for generating a live broadcast video of highlight collection according to claim 3, wherein the method further comprises performing the following step before the saving the currently cached data packet of the live broadcast video as the highlight segment:
determining if a playing duration of the currently cached data packet of the live broadcast video exceeds a preset upper limit; and
if the preset upper limit is exceeded, discarding a part of data in the cached data packet of the live broadcast video.

5. The method for generating a live broadcast video of highlight collection according to claim 4, wherein the discarding a part of data in the cached data packet live broadcast video specifically comprises:
sequentially discarding, according to a playing order of the data packet of the live broadcast video, video frame sequences in the currently cached data packet of the live broadcast video from front to back, until the playing duration of the cached data packet of the live broadcast video obtained after the discarding does not exceed the preset upper limit.

6. The method for generating a live broadcast video of highlight collection according to claim 3, wherein the data packet of the live broadcast video saved as the highlight segment is specifically a cached data packet of the live broadcast video in which a first video frame thereof is a key frame.

7. The method for generating a live broadcast video of highlight collection according to claim 1, wherein, the method further comprises performing the following step before the merging the highlight segment into the live broadcast video based on the merging condition:
if the number of the saved highlight segment is more than one, splicing a plurality of highlight segments into one highlight collection; and
the merging the highlight segment into the live broadcast video is specifically: merging the highlight collection into the live broadcast video.

8. The method for generating a live broadcast video of highlight collection according to claim 7, wherein the splicing the plurality of highlight segments into one highlight collection specifically comprises:
editing each of the highlight segment;
performing a timestamp recovery on each of the edited highlight segment; and
splicing each of the highlight segment obtained after the timestamp recovery, into one highlight collection according to a timestamp order.

9. The method for generating a live broadcast video of highlight collection according to claim 1, wherein the switching the output live broadcast video to the merged video of highlight collection specifically comprises:
determining if a switching time point is satisfied, according to a timestamp of the live broadcast video; and
if the switching time point is satisfied, switching the output live broadcast video to the merged video of highlight collection.

10. The method for generating a live broadcast video of highlight collection according to claim 1, wherein the method further comprises performing the following after the switching the output live broadcast video to the merged video of highlight collection:
determining remaining duration of the merged video of highlight collection; and
when the remaining duration is zero, switching, an output merged video of highlight collection to the live broadcast video.

11. The method for generating a live broadcast video of highlight collection according to claim 1, wherein the method further comprises performing the following after the switching the output live broadcast video to the merged video of highlight collection:
determining remaining duration of the merged video of highlight collection; and
when the remaining duration of the merged video of highlight collection is zero, determining if a first video frame of the live broadcast video is a key frame; and
if the first video frame of the live broadcast video is the key frame, switching an output merged video of highlight collection to the live broadcast video.

12. The method for generating a live broadcast video of highlight collection according to claim 1, wherein identifying the live broadcast picture and determining if the target image element exists in the live broadcast picture, according to an image identification model established in advance specifically comprises:
obtaining a specified area in the live broadcast picture;
identifying if the target image element exists in the specified area according to the image identification model established in advance; and if the target image element exists in the specified area, determining that the target image element exists in the live broadcast picture.

13. The method for generating a live broadcast video of highlight collection according to claim 12, wherein the identifying if the target image element exists in the specified area specifically comprises:
    capturing a target area in the specified area according to a size of the target image element;
    inputting a feature value of the target area to the image identification model, and determining if the target image element exists in the target area according to an output result of the image identification model; and
    if the target image element does not exist in the target area, shifting a location of the target area according to a preset rule, and identifying if the target image element exists in the shifted target area.

14. The method for generating a live broadcast video of highlight collection according to claim 12, wherein the method further comprises performing the following step after the obtaining a specified area in the live broadcast picture: obtaining a greyscale map for the specified area; and
    identifying if the target image element exists in the specified area according to the image identification model established in advance specifically comprises:
    identifying if the target image element exists in the greyscale map according to the image identification model established in advance.

15. A server, comprising:
    at least one processor; and
    a memory communicatively connected to the at least one processor, wherein
    the memory stores instructions executable by the at least one processor, and the instructions are executed by the at least one processor to enable the at least one processor to implement a method for generating a live broadcast video of highlight collection, wherein, the method comprises:
        identifying a live broadcast picture from a live broadcast video and determining if a target image element exists in the live broadcast picture;
        if the target image element exists in the live broadcast picture, saving, as a highlight segment, a segment of the live broadcast video having the live broadcast picture;
        when a merging condition is satisfied, merging the highlight segment into the live broadcast video based on the merging condition to obtain a merged video of highlight collection; and
        switching an output live broadcast video to the merged video of highlight collection;
    wherein the identifying a live broadcast picture and determining if a target image element exists in the live broadcast picture specifically comprises:
        autonomously identifying the live broadcast picture and autonomously determining if the target image element exists in the live broadcast picture, according to an image identification model established in advance, wherein the image identification model is established by training according to collected image features;
    wherein the merging condition is autonomously determined according to the image identification model; and
    wherein the merging the highlight segment into the live broadcast video based on the merging condition to obtain a merged video of highlight collection comprises:
        decoding the highlight segment, and decoding the live broadcast video;
        merging each video frame of the decoded highlight segment with each video frame of the decoded live broadcast video in a preset mode, to obtain merged video data; and
        recoding the merged video data to obtain the merged video of highlight collection, such that the merged video of highlight collection displays the live broadcast video and the highlight segment simultaneously.

16. A non-transitory computer readable storage medium storing a computer program, wherein when being executed by a processor, the computer program implements a method for generating a live broadcast video of highlight collection, wherein, the method comprises:
    identifying a live broadcast picture from a live broadcast video and determining if a target image element exists in the live broadcast picture;
    if the target image element exists in the live broadcast picture, saving, as a highlight segment, a segment of the live broadcast video having the live broadcast picture;
    when a merging condition is satisfied, merging the highlight segment into the live broadcast video based on the merging condition to obtain a merged video of highlight collection; and
    switching an output live broadcast video to the merged video of highlight collection;
    wherein the identifying a live broadcast picture and determining if a target image element exists in the live broadcast picture specifically comprises:
        autonomously identifying the live broadcast picture and autonomously determining if the target image element exists in the live broadcast picture, according to an image identification model established in advance, wherein the image identification model is established by training according to collected image features;
    wherein the merging condition is autonomously determined according to the image identification model; and
    wherein the merging the highlight segment into the live broadcast video based on the merging condition to obtain a merged video of highlight collection comprises:
        decoding the highlight segment, and decoding the live broadcast video;
        merging each video frame of the decoded highlight segment with each video frame of the decoded live broadcast video in a preset mode, to obtain merged video data; and
        recoding the merged video data to obtain the merged video of highlight collection, such that the merged video of highlight collection displays the live broadcast video and the highlight segment simultaneously.

* * * * *